United States Patent
Murakami

(10) Patent No.: US 9,783,131 B2
(45) Date of Patent: Oct. 10, 2017

(54) DECORATED MOLDED ARTICLE

(71) Applicant: MORIROKU TECHNOLOGY COMPANY, LTD., Tokyo (JP)

(72) Inventor: Kiyoshi Murakami, Tokyo (JP)

(73) Assignee: MORIROKU TECHNOLOGY COMPANY LTD., Tokyo (JP)

( * ) Notice: Subject to any disclaimer, the term of this patent is extended or adjusted under 35 U.S.C. 154(b) by 65 days.

(21) Appl. No.: 15/079,330

(22) Filed: Mar. 24, 2016

(65) Prior Publication Data

US 2016/0280152 A1  Sep. 29, 2016

(30) Foreign Application Priority Data

Mar. 25, 2015 (JP) ................. 2015-063282

(51) Int. Cl.
*B32B 3/04* (2006.01)
*B60R 13/02* (2006.01)

(52) U.S. Cl.
CPC .......... *B60R 13/02* (2013.01); *B60R 13/0256* (2013.01)

(58) Field of Classification Search
CPC ....... Y10T 428/2419; Y10T 428/24248; Y10T 428/24612; B29C 63/04; B29C 63/042; B29C 63/048; B60R 13/02; B60R 13/0256
USPC ................................... 428/121, 128
See application file for complete search history.

(56) References Cited

FOREIGN PATENT DOCUMENTS

JP          4-288214         10/1992

*Primary Examiner* — Alexander Thomas
(74) *Attorney, Agent, or Firm* — Rankin, Hill & Clark LLP

(57) ABSTRACT

A decorated molded article includes a corner portion in the form of an entirely rounded corner portion. The rounded corner portion has a distal end face at a distal end thereof. The distal end face has a width determined by an outer curved line and an inner curved line. The inner curved line has a central portion curved to approach the outer curved line. The width of the distal end face of the rounded corner portion is smaller than a width of a distal end face formed at a distal end of the first wall extending from the substrate body.

5 Claims, 6 Drawing Sheets

DECORATED MOLDED ARTICLE

FIELD OF THE INVENTION

The present invention relates to a decorated molded article having a resin substrate and a decorative sheet applied to a front or obverse side of the resin substrate.

BACKGROUND OF THE INVENTION

Instrument panels, console boxes, glove boxes, etc. which are provided on an interior side of a vehicle are correctively called "interior members", while bumpers, etc. which are provided on an exterior side of the vehicle are called "exterior members". The interior members and the exterior members may be made of decorated molded articles. The decorated molded articles consist of a resin substrate molded of a synthetic resin material and a decorative sheet bearing a decorative pattern and applied to a front or obverse side of the resin substrate.

The decorative sheet is a design member made of a resin sheet having a woodgrain-tone or a leather-tone, a resin sheet integrated with a foamed resin, a cloth, an unwoven fabric, etc. The decorative sheet as applied to the resin substrate can improve appearance design property of the interior members or the exterior members.

Techniques for applying a decorative sheet to a resin substrate are known as disclosed, for example, in Japanese Patent Application Laid-open Publication (JP-A) No. H04-288214. According to the technique disclosed in JP H04-288214A, a decorative sheet is held between an upper molding chamber and a lower molding chamber. Internal spaces of the upper and lower molding chambers, which are separated by the decorative sheet, are evacuated into a vacuum state. The decorative sheet is heat-softened and then placed over the upper surface of a resin substrate held inside the lower molding chamber. Thereafter, the outside air is introduced into the upper molding chamber whereupon the decorative sheet is caused to closely adhere to the resin substrate due to a pressure difference created during a vacuum pressure molding process.

The technique disclosed in JP H04-288214 is successful when used in combination with a resin substrate having a constant cross section. However, because many interior or exterior members have corner sections, the disclosed technique would encounter a problem that a decorative sheet is caused to gather into folds and creates wrinkles at a corner section of the resin substrate.

To deal with this problem, an improved technique has been proposed as disclosed in Japanese Patent Application Laid-open Publication (JP-A) 2010-23245. According to the improved technique, a projection is provided on an internal or recessed corner section of a resin substrate for suppressing generation of wrinkles such that when covered with a decorative sheet together with the corner section, the projection takes up or absorbs an excess part of the decorative sheet created at the corner section being covered with the decorative sheet. However, since the projection protrudes from a general surface of the resin substrate, a mating part or component, which is used in combination with a decorated molded article including the resin substrate, is required to have a recess or an opening for receiving the projection to enable attachment of the decorated molded article to a vehicle body. The projection thus constitutes a restriction on the shape and design of the mating component.

Furthermore, the projection provided on the corner section brings about a slight increase in weight of the decorated molded article. In addition, due to the presence of the projection, storage of the resin substrates in a stacked state requires spacers provided between adjacent resin substrates for protection of the projections. The production efficiency of the resin substrates is therefore relatively low.

It is an object of the present invention to provide a decorated molded article which is capable of preventing generation of wrinkles without increasing the weight of the decorated molded article and constituting any restriction on the shape and design of a mating component.

SUMMARY OF THE INVENTION

According to a first aspect of the present invention, there is provided a decorated molded article, comprising: a resin substrate molded of a synthetic resin material; and a decorative sheet provided with a decoration and applied to an obverse side of the resin substrate, the resin substrate including a substrate body, a first wall rising from a reverse side of the substrate body, a second wall rising from the reverse side of the substrate body and arranged in orthogonal relation to the first wall, and a corner portion formed at a merging point between the first wall and the second wall, the corner portion being an entirely rounded corner portion, the rounded corner portion extending from the substrate body and having a distal end face at a distal end thereof, the distal end face having a width determined by an outer curved line and an inner curved line, the inner curved line having a central portion curved to approach the outer curved line, the width of the distal end face of the rounded corner portion being smaller than a width of a distal end face formed at a distal end of the first wall extending from the substrate body.

With the rounded corner thus arranged, the decorated molded article is able to suppress generation of wrinkles on a decorative sheet applied to the obverse side of the resin substrate.

Preferably, the inner curved line has a length approximately equal to a length of the outer curved line.

It is preferable that the rounded corner portion is recessed on an inner side thereof to form a curved inclined surface curved in a concave shape and inclined in such a manner as to gradually reduce a thickness of the rounded corner portion toward the distal end of the rounded corner portion. The rounded corner portion recessed on its inner side achieves a reduction in weight of the decorated molded article. Additionally, the recessed corner portion is free from interference with a mating component and does not constitute any restriction on the shape and design of the mating component.

According to a second aspect of the present invention, there is provided a decorated molded article comprising: a resin substrate molded of a synthetic resin and having an obverse side and a reverse side opposite to the obverse side, the resin substrate further having a peripheral edge bent toward the reverse side thereof, the peripheral edge having at least one curved inner corner portion, the curved inner corner portion being thinned on an inner side thereof in such a manner as to gradually reduce a thickness of the curved inner corner portion in a direction from an inner end toward an outer end of the peripheral edge; and a decorative sheet applied to the obverse side of the resin substrate in such a manner as to enclose the peripheral edge from the obverse side toward the reverse side of the resin substrate.

By virtue of the curved inner corner portion thinned on the inner side thereof in such a manner as to gradually reduce the thickness of the corner portion toward the outer end of the peripheral edge, the decorative sheet applied to the obverse side of the resin substrate is free from wrinkles.

In one preferred form of the invention, the curved inner corner portion is recessed on the inner side to form a curved inclined surface curved in a concave shape and inclined in such a manner as to gradually reduce the thickness of the curved inner corner portion toward the outer end of the peripheral edge.

DETAILED DESCRIPTION OF THE PREFERRED EMBODIMENT

A certain preferred structural embodiment of the present invention will be described in greater details below, by way of example only, with reference to the accompanying sheets of drawings.

Figure 1:
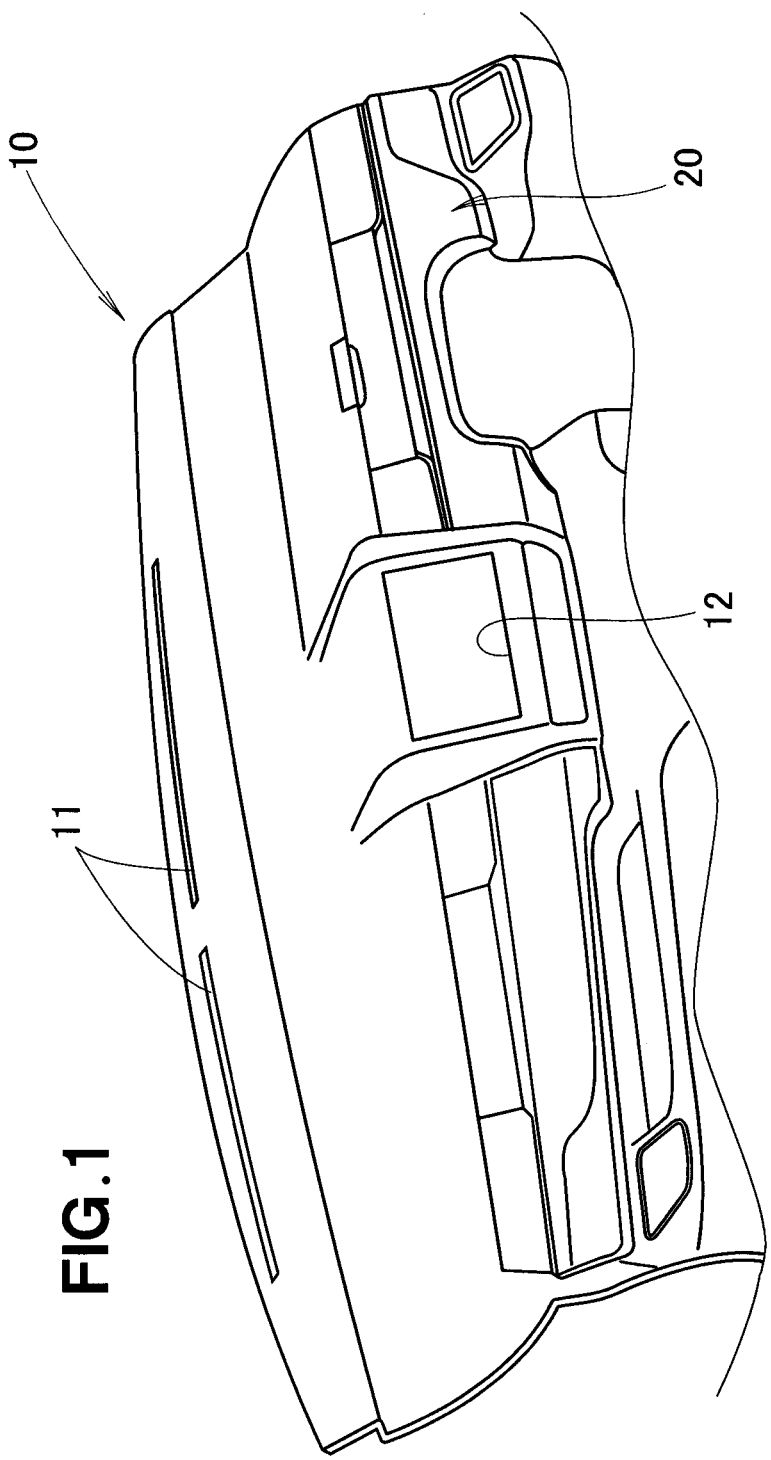
FIG. 1 is perspective view of an instrument panel including a decorated molded article according to the present invention.

As shown in FIG. 1, an instrument panel 10 for a vehicle has a pair of elongated air outlets 11 formed therein along a front edge thereof, a display opening 12 formed therein at a widthwise central part thereof, and a decorated molded article 20 according to the present invention, the molded article 20 being provided on a right side of the display opening 12.

Figure 2:
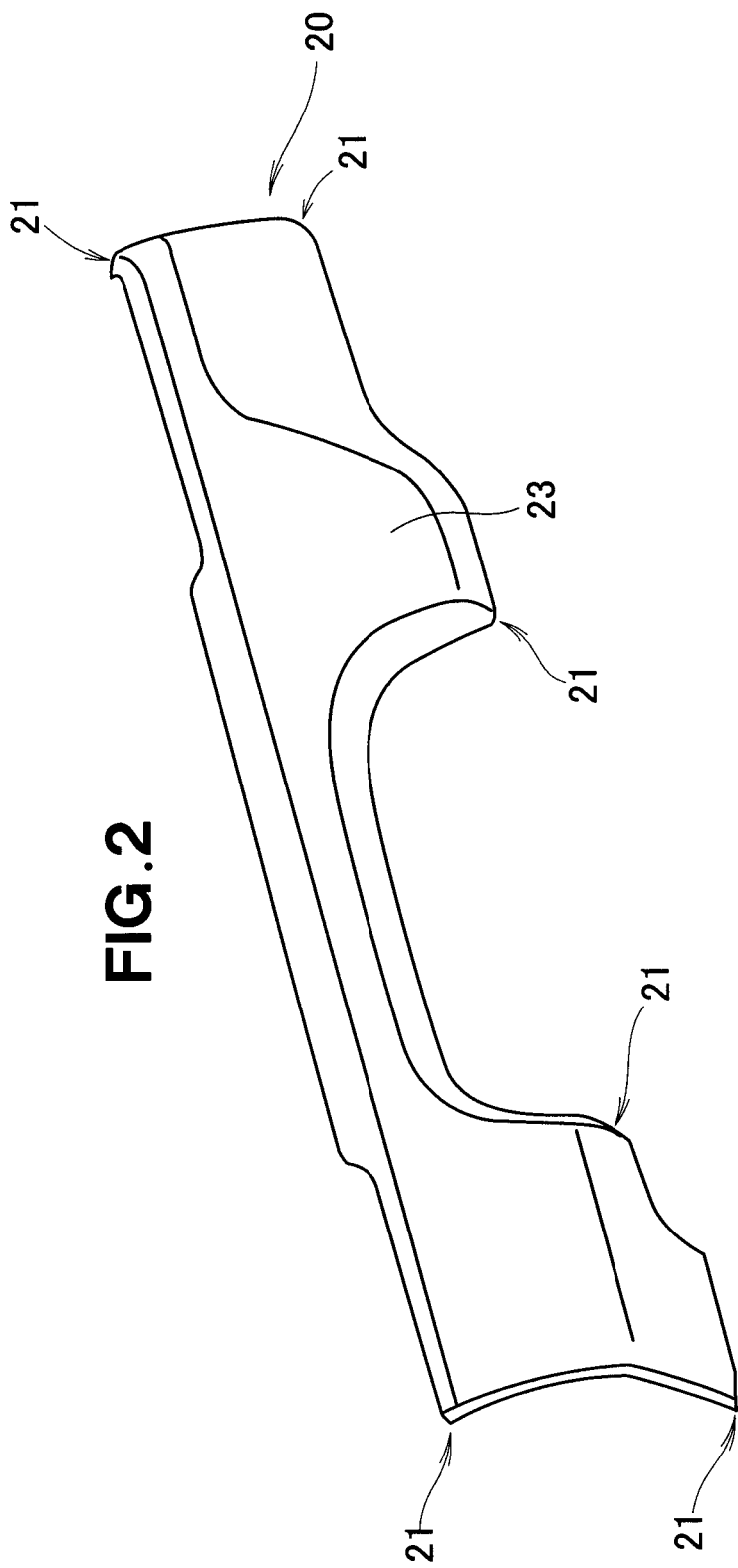
FIG. 2 is a perspective view of the decorated molded article.

As shown in FIG. 2, the decorated molded article 20 is formed into a horizontally elongated rectangular shape and has a plurality of corner portions 21. The decorated molded article 20 is covered with a decorative sheet 23 at least on its surface which is adapted to face a vehicle passenger compartment.

The decorative sheet 23 may be made of a thick decorative sheet with an adhesive layer applied to one side thereof, or a thin decorative film with an adhesive layer applied to one side thereof. An adhesive forming the adhesive layer may be made of a thermosetting adhesive or a thermoplastic adhesive. More specifically, eligible materials for the adhesive may include urethane-based adhesives, epoxy-based adhesives, rubber-based adhesives, melamine-based adhesives, phenol-based adhesives, cyan-based adhesives, etc. The decorative sheet 23, which may be replaced by a thin decorative film, preferably has a metal deposition layer, a printed layer, or an uneven pattern provided on a design face thereof for decoration. The form of the decoration can be changed in option.

Figure 3:
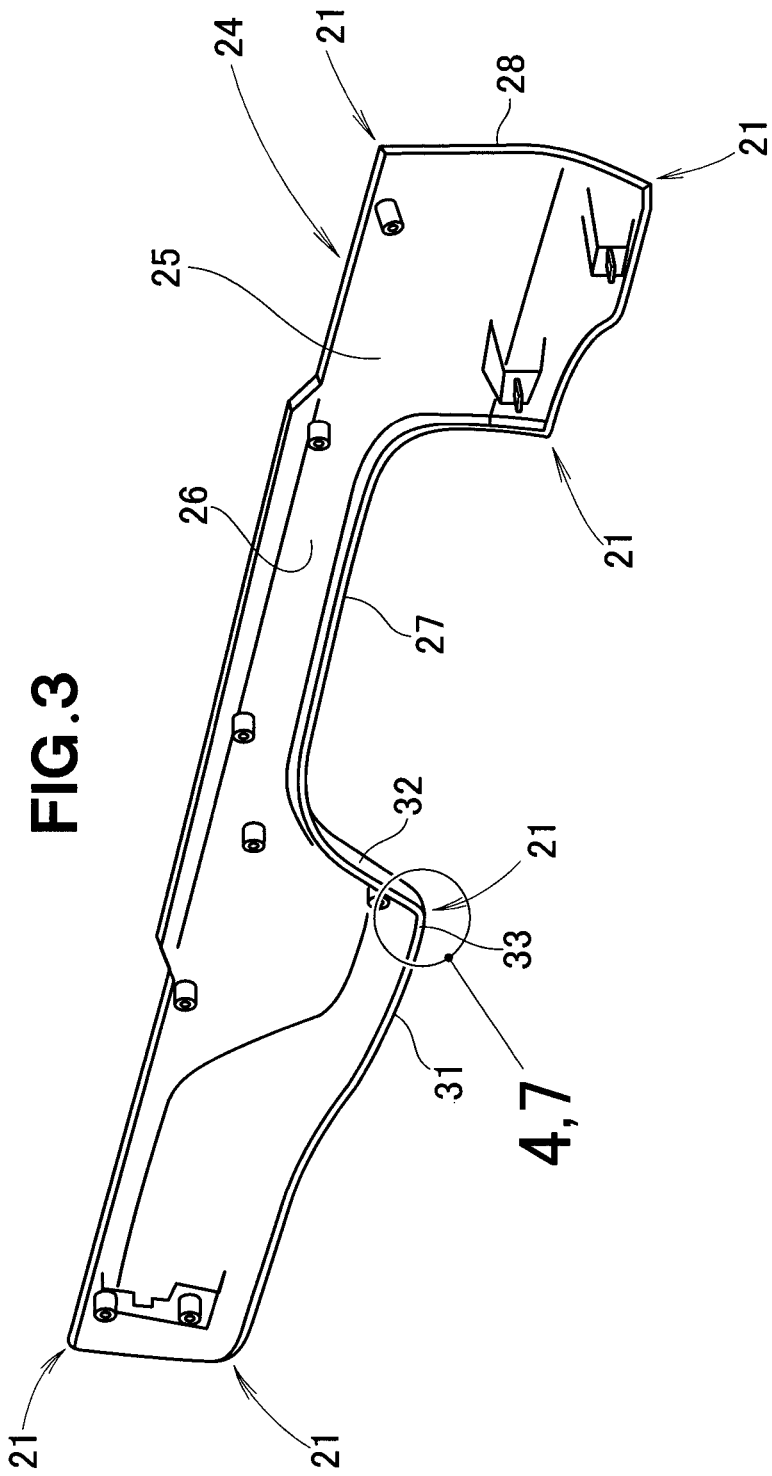
FIG. 3 is a perspective view of the decorated molded article as seen from the back side thereof.

A resin substrate 24 shown in FIG. 3 may be made of a polyamide (PA) resin, a polycarbonate (PC) resin, an acrylonitrile-butadiene-styrene (ABS) resin, a polypropylene (PP) resin, an alloy resin of a polycarbonate acrylonitrile-butadiene-styrene resin with a polycarbonate resin (ABS+PC resin), etc. The kind of resins available for forming the resin substrate 24 is not limited to those specified above.

As shown in FIG. 3, the resin substrate 24 includes a substrate body 25 of an elongate rectangular plate-like configuration, and a peripheral wall 27 rising from a reverse side 26 of the substrate body 25 in such a manner as to extend toward a front side of the vehicle. The peripheral wall 27 is covered with an outer edge portion of the decorative sheet 23 (FIG. 2) in such a manner as to be wrapped from a font or obverse side 28 toward the reverse side 26 of the substrate body. The peripheral wall 27 forms a part of a peripheral edge of the resin substrate 24 bent toward the reverse side 26 of the substrate body 25, the peripheral edge having at least one curved inner corner portion 21.

For the purpose of convenience, a lower side wall part of the peripheral wall 27 is referred to as a first wall 31, and a wall part of the peripheral wall 27 merging with the first wall 31 is referred to as a second wall 32. One of the corner portions 21 which is formed at a merging point between the first wall 31 and the second wall 32 will be described in greater detail. The corner portion 21 extends from the reverse side 26 of the substrate body 25 and has a distal end face 33 at a distal end thereof.

Figure 4:
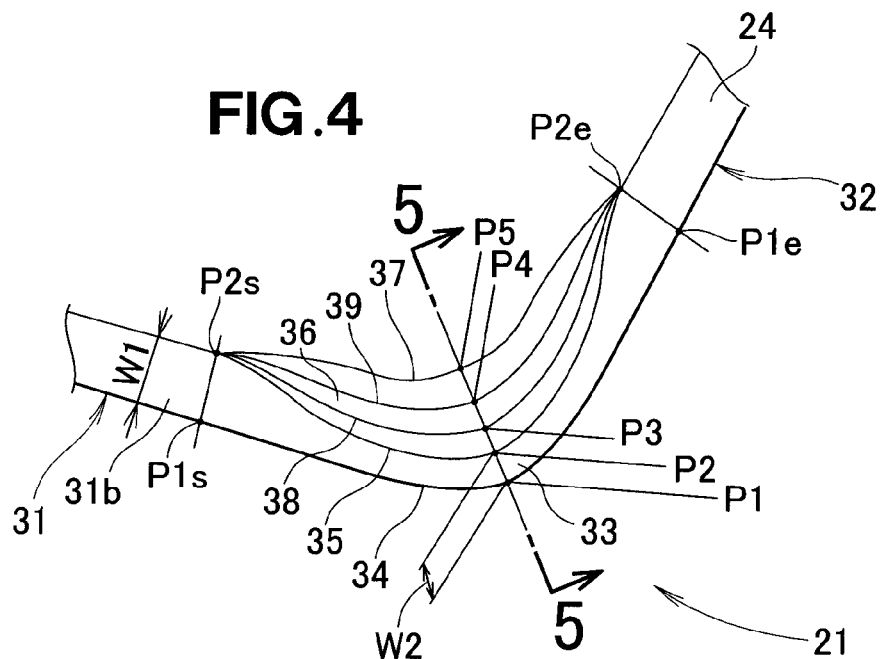
FIG. 4 is an enlarged view of part 4 of FIG. 3 with a decorative sheet omitted for clarity.

The resin substrate 24 shown in FIG. 4 is in a condition before being subjected to application of the decorative sheet 23 (FIG. 2). As shown in FIG. 4, the corner portion 21 is a so-called "rounded corner portion" and, unlike a sharp corner, the rounded corner portion 21 has an entirely rounded shape. The distal end face 33 of the corner portion 21 has a width W2 set to be smaller than a width W1 of a distal end face 31b of the first wall 31. Preferably, the ratio of the width W2 to the width W1 is 0.2 to 0.6. The width W2 of the distal end face 33 is defined by two lines; an outer curved line 34 and an inner curved line 35.

The outer curved line 34 is a simply curved line, which extends from a point P1s on the front side of the first wall 31 to a point P1e on the front side of the second wall 32 via an intermediate point P1. On the other hand, the inner curved line 35 is a complicatedly curved line, which extends from a point P2s on the back side of the first wall 31 to a point P2e on the back side of the second wall 32 via an intermediate point P2. The inner curved line 35 has a central portion bent or swelled outwardly toward the outer curved line 34 so that the intermediate point P2 approaches the intermediate point P1. Due to swelling or meandering, a line segment P2s-P2 of the inner curved line 35 increases in length to such an extent that the length of the line segment P2s-P1 is approximately equal to a length of a line segment P1a-P1 of the outer curved line 34.

Figure 5:
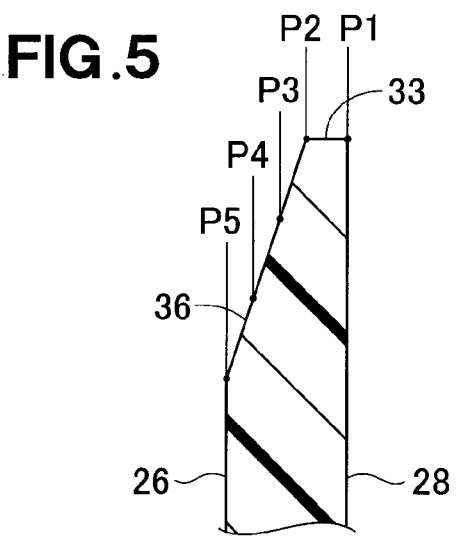
FIG. 5 is a cross-sectional view taken along line 5-5 of FIG. 4.

As shown in FIG. 5, the distal end face 33 of the corner portion 21 is defined between the intermediate point P1 and the intermediate point P2. A curved inclined surface 36 extends downwardly from the intermediate point P2. This means that the corner portion 21 is thinned only on its inner side thereof in such a manner as to gradually reduce a thickness of the corner portion 21 in a direction toward the distal end of the corner portion 21. More specifically, the corner portion 21 is recessed on the inner side thereof to form the curved inclined surface 36 curved in a concave shape in a circumferential direction of the peripheral wall 27 and inclined in such a manner as to gradually reduce the thickness of the corner portion toward the distal end of the corner portion 21.

As shown in FIG. 5, we can plot three points P3, P4 and P5 on the curved inclined surface 36. Referring back to FIG.

4, the point P5 is located on an innermost curved line 37 contiguous from respective inner surfaces of the first and second walls 31, 32. A first intermediate curved line 38 and a second intermediate curved line 39 can be imaginarily drawn as presenting between the inner curved line 35 and the innermost curved line 37. The point P3 is located at an intersection between the first intermediate curved line 38 and a cutting line 5-5, and the point P4 is located at an intersection between the second intermediate curved line 39 and the cutting line 5-5.

A line segment P2s-P2 of the first intermediate curved line 38 is swelled or meandered to increase its length to such an extent that the length of the line segment P2s-P2 is approximately equal to the length of the line segment P1s-P1 of the outer curved line 34. This means that the first intermediate curved line 38 has a length approximately equal to the length of the outer curved line 34. Similarly, a line segment P2s-P4 of the second intermediate curved line 39 is swelled or meandered to increase its length to such an extent that the length of the line segment P2s-P4 is approximately equal to the length of the line segment P1s-P1 of the outer curved line 34. Thus, the second intermediate curved line 39 has a length approximately equal to the length of the outer curved line 34. The curved inclined surface 36 is formed on an inner side of the corner portion 21 in such a manner as to concave toward the back side of a drawing sheet including FIG. 4.

Figure 6A:
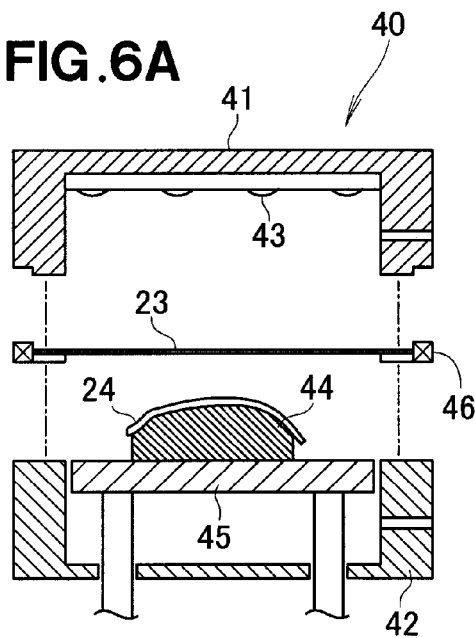
FIGS. 6A to 6E are views illustrative of a manufacturing process of the decorative molded article.

The resin substrate 24 having the foregoing corner portion 21 is next subjected to a decorative sheet applying process, as will be described below. As shown in FIG. 6A, a vacuum pressure molding apparatus 40 includes an upper molding chamber 41 and a lower molding chamber 42. The upper molding chamber 41 is equipped with a heater 43. The hater 43 may be a lamp heater, for example. The lower molding chamber 42 is equipped with a support base 44 for supporting thereon a resin substrate 24, and a lift table 45 for vertically moving the support base 44.

A decorative sheet 23 held in a stretched condition by a jig 46 is placed between the upper molding chamber 41 and the lower molding chamber 42. The upper molding chamber 41 is lowered until it comes in contact with the lower molding chamber 42. As shown in FIG. 6B, an internal space of the upper and lower molding chambers 41, 42 is separated by the decorative sheet 23 into an upper space 47 and a lower space 48. The upper space 47 and the lower space 48 are evacuated into a vacuum state by operation of a vacuum pump (not shown). The heater 43 is energized to heat the decorative sheet 23.

Then, the lift table 45 and support base 45 carried thereon are moved upward. With this movement, the resin substrate 24 supported on the support base 45 is forced against a back side of the decorative sheet 23 to thereby stretch the decorative sheet 23 to a proper extent, as shown in FIG. 6C.

Figure 6D:
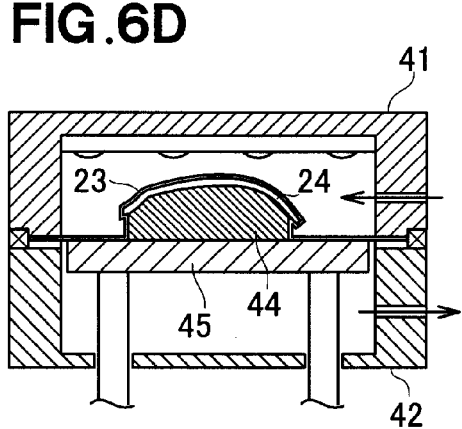
Figure 6B:
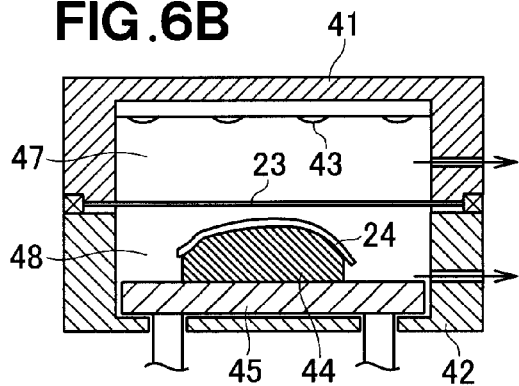

Subsequently, evacuation of the upper space 47 is terminated and the outside air is introduced into the upper space 47, as shown in FIG. 6D. The decorative sheet 23 is subjected to an atmospheric pressure acting on an upper side thereof and a vacuum pressure acting on a lower side thereof. Due to a pressure difference created between the upper side and the lower side of the decorative sheet 23, the decorative sheet 23 comes into adhesion with a front or obverse side of the resin substrate 24 while wrapping or enclosing a peripheral edge from the obverse side toward a reverse side of the resin substrate 24.

Figure 6E:
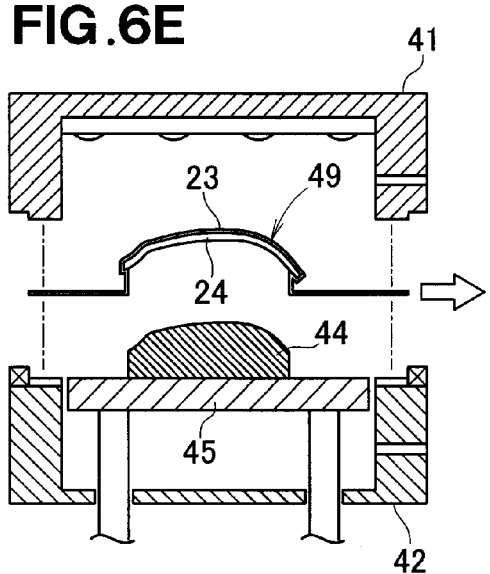
Figure 6C:
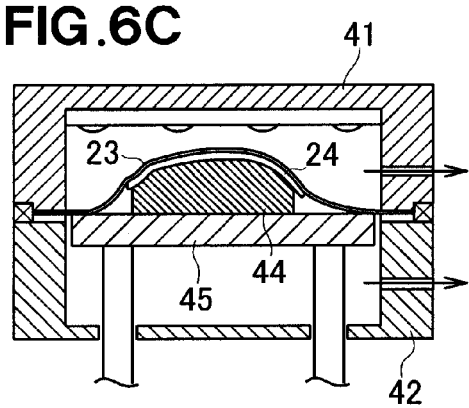

Thereafter, the upper molding chamber 41 is moved upward, as shown in FIG. 6E, and an intermediate product 49 having the decorative sheet 23 applied to the resin substrate 24 without trimming is taken out or removed from the vacuum pressure molding apparatus 40 (FIG. 6A). The intermediate product 49 is then subjected to a trimming process in which an excess part of the decorative sheet 23 is trimmed or removed. A decorated molded article 20 (FIG. 2) can thus be obtained as a final product.

Figure 7:
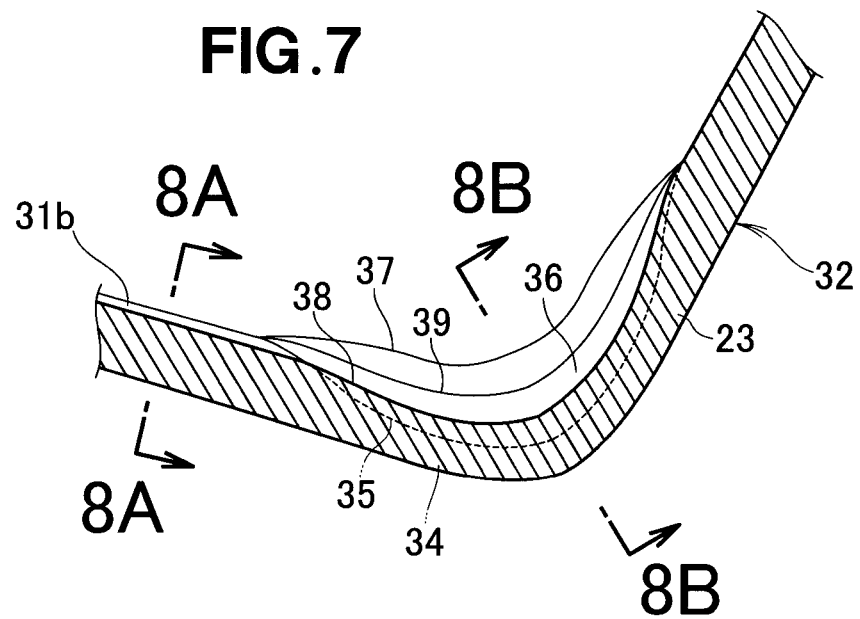
FIG. 7 is an enlarged view of part 7 of FIG. 3 shown with a decorative sheet applied to the front side of the decorated molded article.
Figures 8A, 8B:
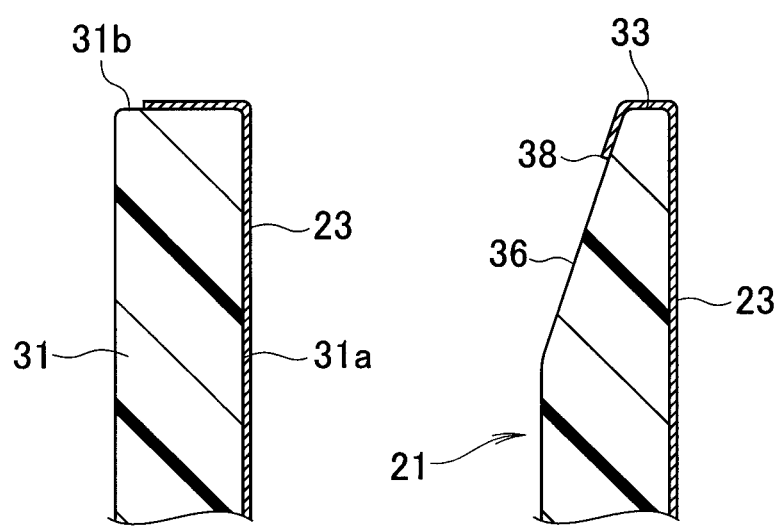
FIG. 8A is a cross-sectional view taken along line 8A-8A of FIG. 7.
FIG. 8B is a cross-sectional view taken along line 8B-8B of FIG. 7.

A main part of the decorated molded article 20 will be described with reference to FIGS. 7 and 8. As shown in FIG. 8A, which is a cross-sectional view taken along line 8A-8A of FIG. 7, at a position located on the first wall 31, the decorative sheet 23 extends to wrap or enclose a distal end face 31b from a front side 31a of the first wall 31 and is cut by trimming at an intermediate portion of the distal end face 31b. The distal end face 31b of the first wall 31, which is partially uncovered by the decorative sheet 23, is shown in FIG. 7 wherein the decorative sheet 23 is hatched for the purpose of clarity. The first wall 31 has a constant cross-sectional shape and hence is free from a problem of wrinkle generation. Similarly to the first wall 31, the second wall 32 has a constant cross-sectional shape and hence is free from a wrinkle-generating problem.

As shown in FIG. 8B, which is a cross-sectional view taken along line 8B-8B of FIG. 7, at the corner portion 21, the decorative sheet 23 extends to wrap or enclose the distal end face 33 and the curved inclined surface 36 from the front side of the corner portion 21 and cut by trimming at an intermediate portion of the curved inclined surface 36. The trimming is performed along the first intermediate curved line 38. As shown in FIG. 7, respective lengths of the first intermediate curved line 38 and the inner curved line 35 are preferably set to be approximately equal to the length of the outer curved line 34. This arrangement can eliminate a risk of generation of wrinkles on the decorative sheet 23.

The decorative sheet 23 may be trimmed along the second intermediate curved line 39. Trimming of the decorative sheet 23 may be performed at any desired position as long as the position is located on the curved inclined surface 36. A device for generating a pressure difference may be replaced from the one employed in the vacuum pressure molding apparatus 40 to any other devices such as those used in conventional vacuum molding apparatus provided that they can achieve an equivalent function. In the illustrated embodiment, the decorated molded article 20 comprises an interior member assembled with the instrument panel. The decorated molded article may also include other interior members such as a console box, a glove box, etc. as well as exterior members such as bumpers, etc. The type of decorated molded article 20 is not limited to those specified above.

Obviously, various minor changes and modifications of the present invention are possible in the light of the above teaching. It is therefore to be understood that within the scope of the appended claims the invention may be practiced otherwise than as specifically described.

What is claimed is:
1. A decorated molded article, comprising;
a resin substrate molded of a synthetic resin material; and
a decorative sheet provided with a decoration and applied to an obverse side of the resin substrate,
the resin substrate including a substrate body, a first wall rising from a reverse side of the substrate body, a second wall rising from the reverse side of the substrate body and arranged in orthogonal relation to the first wall, and a corner portion formed at a merging point between the first wall and the second wall, the corner portion being an entirely rounded corner portion, the rounded corner portion extending from the substrate body and having a distal end face at a distal end thereof, the distal end face having a width determined by an outer curved line and an inner curved line, the inner curved line having a central portion curved to approach the outer curved line, the width of the distal end face of the rounded corner portion being smaller than a width of a distal end face formed at a distal end of the first wall extending from the substrate body.

2. The decorated molded article according to claim 1, wherein the inner curved line has a length approximately equal to a length of the outer curved line.

3. The decorated molded article according to claim 1, wherein the rounded corner portion is recessed on an inner side thereof to form a curved inclined surface curved in a concave shape and inclined in such a manner as to gradually reduce a thickness of the rounded corner portion toward the distal end of the rounded corner portion.

4. A decorated molded article comprising:

a resin substrate molded of a synthetic resin and having an obverse side and a reverse side opposite to the obverse side, the resin substrate further having a peripheral edge bent toward the reverse side thereof, the peripheral edge having at least one curved inner corner portion, the curved inner corner portion being thinned on an inner side thereof in such a manner as to gradually reduce a thickness of the curved inner corner portion in a direction from an inner end toward an outer end of the peripheral edge; and a decorative sheet applied to the obverse side of the resin substrate in such a manner as to enclose the peripheral edge from the obverse side toward the reverse side of the resin substrate.

5. The decorated molded article according to claim 4, wherein the curved inner corner portion is recessed on the inner side to form a curved inclined surface curved in a concave shape and inclined in such a manner as to gradually reduce the thickness of the curved inner corner portion toward the outer end of the peripheral edge.

* * * * *